Patented Nov. 5, 1946

2,410,647

UNITED STATES PATENT OFFICE 2,410,647

PRODUCTION OF ALLYL CHLORIDE

Walter Flemming and Gerhard Stein, Ludwigshafen-on-the-Rhine, Germany, assignors, by mesne assignments, to General Aniline & Film Corporation, New York, N. Y., a corporation of Delaware No Drawing. Application July 6, 1938, Serial No. 217,779. In Germany July 29, 1937

4 Claims. (Cl. 260—654)

The present invention relates to the production of allyl chloride.

We have found that allyl chloride can be obtained in a very advantageous manner by causing chlorine to react with an excess of propane or propylchloride alone or in admixture with each other or with propylene at temperatures between about 500° and about 700° C., and causing the reaction to proceed with the aid of metallic contact catalysts which are indifferent to the action of hydrogen chloride.

Any propylchloride formed in addition to allyl chloride or remaining unchanged in the said process may subsequently be converted into allyl chloride by the removal of hydrogen. This may be effected for example by subjecting them again to the said treatment or splitting off hydrogen therefrom by treatment with agents binding hydrogen at high temperatures, whereby, contrary to expectation, the halogen remains in the molecule.

When the said reaction is carried out at comparatively low speeds of flow, it may happen that an undesirable reaction between the reactants takes place in the gas mixture before the catalyst zone is reached; the reaction then takes place somewhat in the same way as a flame striking back, strong formation of carbon black thus taking place. The speed of flow must therefore always be relatively high and, indeed, higher than the speed of flame propagation. The reaction then takes place in the desired manner only after reaching the front part of the catalyst or in a relatively small zone situated on the catalyst or at its end.

As catalysts there are used metals or mixtures of metals or alloys which undergo no reaction or no appreciable reaction with hydrogen chloride, as for example chromium-nickel or chromium-nickel-iron alloys, platinum, rhodium, silver, tungsten, tantalum, niobium, osmium, and alloys of the same with each other or with other metallic constituents. The catalysts are preferably used in the form of netting, rolled-up netting, spirals, threads, granules, balls or cuttings. Shaped carrier material may also be provided with a coating of good thermal conductivity of metals or metal alloys suitable as catalysts. Their resistance to chemical attack may advantageously be increased by a thin coating of graphitic carbon (lustrous black carbon) which may be produced on the surface of the catalyst for example by burning in a coating of brown coal tar.

The mixing proportions of chlorine and the propane or propyl chloride serving as initial material are preferably so chosen that the chlorine is present in a smaller amount than corresponds to the theoretical amount. For example it is advantageous to use a proportion of from about 2 to 3 molecular proportions of propane to 1 molecular proportion of chlorine or 3 molecular proportions of propyl chloride to 1 molecular proportion of chlorine.

It is advantageous to introduce the chlorine and the propane or propyl chloride to be reacted separately into the reaction chamber and to mix them a short distance in front of the catalyst. This may readily be effected through suitable nozzles. The starting materials may separately be preheated before the reaction, or it may be sufficient to preheat propane or propyl chloride alone and to then admix them with cold chlorine. The temperature should be so chosen that the mixture is preheated to at least 150° C. The preheated mixture is now led with high speed of flow into the reaction chamber, in which the metal catalyst is situated. The catalyst is heated, before starting the reaction to at least 350° C., advantageously to reaction temperature between 500° and about 700° C. The reaction commences after a short time and it remains limited to a small zone of the catalyst which is continuously heated to red heat by the reaction heat formed. Further external heating should then be discontinued. When working with a high throughput, it may even be necessary to conduct the heat formed away by cooling in order to avoid a too far reaching heating.

It is usual to work at normal pressure, but it is possible to carry out the reaction at reduced or increased pressure. Diluent inert gases, such as nitrogen may also be used. The reaction gases obtained are cooled after leaving the reaction chamber, whereby a part of the allyl chloride formed separates; the part which does not separate is separated from the hydrogen chloride formed, preferably with water in washing towers, dried and separated by strong cooling or compression.

The following examples will further illustrate how our present invention may be carried out in practice but the invention is not restricted to these examples.

Example 1

A rolled-together chromium-nickel wire netting is charged into the rear part of a tube of V2A-steel (a corrosion-resistant steel containing from 15 to 20 per cent of chromium, from 5 to 9 per cent of nickel and from 0.1 to 0.3 per cent of carbon). In the front portion of the tube, chlorine is led by means of a narrow tube provided with several fine openings. Over this chlorine inlet tube there flows propane in such an amount that a mixture is formed which contains propane and chlorine in the molecular proportion of 3:1. The propane is preheated to 200° C. and the catalyst is at first heated externally to 400° C. When the mixture of propane and chlorine meets the catalyst, ignition takes place and there is formed in the front part of the catalyst a small glowing zone of from about 1 to 2 centimeters depth which has a temperature of 600° C. By maintaining a relatively high speed of flow of the mixture of propane and chlorine, care is taken that the glowing zone remains continually in the front part of the catalyst. By regulating the preheating of the reactants and the heating specially supplied to the catalyst as well as by regulating the flowing and mixing proportions, it is possible to regulate the temperature of the glowing zone.

The mixture leaving the reaction chamber is cooled, washed, dried and condensed. There is formed in a very good yield a reaction product which contains 32 per cent of allyl chloride, 59 per cent of propyl chloride, 7.6 per cent of propylene chloride and 1.2 per cent of higher chlorination products. Since the mixture leaving the reaction chamber, after removing the hydrogen chloride and adding further amounts of chlorine, is led over the same or a similar catalyst under about the said conditions, the fraction of allyl chloride can be still further considerably increased.

Example 2

A mixture containing 35 per cent of propane and 65 per cent of propylene is substituted for the propane in the manner of working described in Example 1. The catalyst in this case is first heated only to 350° C. Ignition immediately takes place at the catalyst and a small glowing zone is formed within the catalyst which has a temperature of about 600° C. By regulating the heat specially supplied, the temperature of the glowing zone is regulated to 630° C. The mixture leaving the reaction chamber is cooled, washed, dried and condensed by strong cooling to 20° below zero C., the unchanged residual gas being returned in circulation. The condensate contains 58 per cent of allyl chloride, 24 per cent of propyl chloride and about 18 per cent of higher chlorination products.

Example 3

A mixture consisting of 1 molecular proportion of propyl chloride and 2 molecular proportions of propylene is heated to 250° C., and then led together with 1 molecular proportion of chlorine through a tube as described in Example 1. The catalyst was preheated to about 360° C. Ignition takes place at the catalyst, and a small glowing zone is formed therewithin which has a temperature of about 610° C. The reaction gases are worked up in the manner described above. The condensate obtained contains 75 per cent of allyl chloride, 15 per cent of propyl chloride and 10 per cent of higher chlorination products.

What we claim is:

1. The process of producing allyl chloride which comprises causing a mixture of one molecular proportion of chlorine to react in the gas phase with at least two molecular proportions of a compound selected from the group consisting of propane and propyl chloride at a temperature between about 500° and about 700° C., while passing the gas mixture through a reaction space charged with a metal selected from the class consisting of chromium-nickel alloys and chromium-nickel-iron alloys which are stable to the action of hydrogen chloride, said metal being arranged within the reaction space so as to present a large surface area to the gas mixture, and separating allyl chloride from the reaction gases formed.

2. The process of producing allyl chloride which comprises causing a mixture of one molecular proportion of chlorine with at least two molecular proportions of a compound selected from the class consisting of propane and propyl chloride, which mixture is preheated to temperatures above 150° C. but below reaction temperature, to react at a temperature between about 500° and about 700° C. while passing the gas mixture through a reaction space charged with a metal selected from the class consisting of chromium-nickel alloys and chromium-nickel-iron alloys which are stable to the action of hydrogen chloride, said metal being arranged within the reaction space so as to present a large surface area to the gas mixture, and separating allyl chloride from the reaction gases formed.

3. The process of producing allyl chloride which comprises causing one molecular proportion of chlorine to react in the gas phase with at least two molecular proportions of propane at a temperature between about 500° and about 700° C., while passing the gas mixture through a reaction space charged with a chromium-nickel alloy which is stable to the reaction of hydrogen chloride and is arranged within the reaction space so as to present a large surface area to the gas mixture, and separating allyl chloride from the reaction gases formed.

4. The process of producing allyl chloride which comprises causing one molecular proportion of chlorine to react in the gas phase with at least two molecular proportions of propyl chloride at a temperature between about 500° and about 700° C., while passing the gas mixture through a reaction space charged with a chromium-nickel alloy which is stable to the reaction of hydrogen chloride and is arranged within the reaction space so as to present a large surface area to the gas mixture, and separating allyl chloride from the reaction gases formed.

WALTER FLEMMING.
GERHARD STEIN.